(12) United States Patent
Shen

(10) Patent No.: US 10,309,408 B2
(45) Date of Patent: Jun. 4, 2019

(54) BEARING STRUCTURE AND HEAT DISSIPATING FAN USING THE SAME

(71) Applicant: ASIA VITAL COMPONENTS (CHINA) CO., LTD., Shenzhen (CN)

(72) Inventor: Meng Shen, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 313 days.

(21) Appl. No.: 15/352,584

(22) Filed: Nov. 16, 2016

(65) Prior Publication Data

US 2018/0135644 A1   May 17, 2018

(51) Int. Cl.
| F16C 33/10 | (2006.01) |
| F04D 29/056 | (2006.01) |
| F16C 17/10 | (2006.01) |
| F04D 19/00 | (2006.01) |

(52) U.S. Cl.
CPC ......... F04D 29/056 (2013.01); F04D 19/002 (2013.01); F16C 17/10 (2013.01); F16C 33/102 (2013.01); *F16C 2360/46* (2013.01)

(58) Field of Classification Search
CPC .. F16C 33/102; F16C 33/104; F16C 2360/46; F04D 19/002; F04D 29/056
See application file for complete search history.

(56) References Cited

U.S. PATENT DOCUMENTS

| 6,102,675 A * | 8/2000 | Hsieh | F04D 29/057 184/100 |
| 6,554,478 B2 * | 4/2003 | Hsieh | F04D 29/063 384/130 |
| 8,398,307 B2 * | 3/2013 | Chen | F16C 33/104 384/100 |
| 2005/0025643 A1 * | 2/2005 | Lin | F04D 29/063 417/423.13 |
| 2012/0243812 A1 * | 9/2012 | Shih | F16C 33/107 384/100 |
| 2016/0047420 A1 * | 2/2016 | Miyasaka | F16C 35/02 310/90 |

FOREIGN PATENT DOCUMENTS

| CN | 203067311 U | 7/2013 |
| CN | 204664139 U | 9/2015 |

* cited by examiner

*Primary Examiner* — Thomas R Hannon
(74) *Attorney, Agent, or Firm* — C. G. Mersereau; DeWitt LLP

(57) ABSTRACT

A bearing structure includes a heat dissipating fan using the same. The bearing structure comprises a body which has a first surface, a second surface, and an inclined grease guiding surface. The first surface is provided with a shaft hole penetrating through the body. The inclined grease guiding surface is sloped on the first surface. Two end edges of the inclined grease guiding surface individually connect the first surface and the shaft hole. The bearing structure disposed in the heat dissipating fan can prevent the grease from leaking and increase the storage capacity for the grease.

6 Claims, 6 Drawing Sheets

BEARING STRUCTURE AND HEAT DISSIPATING FAN USING THE SAME

BACKGROUND OF THE INVENTION

Field of the Invention

The present invention relates to a bearing structure and a heat dissipating fan using the same and in particular to a bearing structure and a heat dissipating fan using the same, which can prevent the grease from leaking and provide storage space for the grease.

Description of Prior Art

A general bearing is mainly used to pivot on a shaft to reduce the wear of the shaft or the pivoted part in which the wear is caused by a direct running fit between the shaft and other parts. The commonly used bearing is a grease-retaining bearing which is made of sintered powder metallurgy. Due to pore properties of the bearing, the grease is stored in the pores by inherent capillary force after the bearing is immersed in the grease. When the pivoted shaft rotates through the bearing, the grease will be guided out to lubricate the shaft and the bearing, which is most commonly used in the motor.

The heat dissipating fan is the most commonly used in the field of heat dissipation using the structure of a motor or an electrical motor. The grease-retaining bearing is disposed in the shaft sleeve of the fan. The fan wheel hub having plural fan blades and a shaft is correspondingly pivoted on the shaft through the shaft. Thus, by means of the bearing, the friction wear of the shaft or shaft sleeve caused by the rotation can be prevented and thus only the bearing needs replacement if it shows the friction wear.

Besides, by selecting a grease-retaining bearing having grease-retaining properties, the grease retained in the bearing can further reduce the damage of friction wear of the shaft and the bearing. Because the shaft rotates and the grease will be thrown out by centrifugal force, when all the grease in the bearing is thrown out and exhausted, the friction between the shaft and the bearing cause wear and further abnormal sound or result in the situation of the shaft stuck fast in the bearing, which finally damages the heat dissipating fan.

How to prevent the grease from being thrown out and exhausted and increase the lifetime of the heat dissipating fan is the target which the industry currently strives to reach.

SUMMARY OF THE INVENTION

Thus, to overcome the shortcomings of the above prior art, the main objective of the present invention is to provide a bearing structure which can make the lubricating grease of the bearing flow back and increase the lifetime of the bearing.

Another objective of the present invention is to provide a heat dissipating fan which can make the lubricating grease of the bearing flow back and increase the lifetime of the bearing.

To achieve the above objectives, the present invention provides a bearing structure which comprises a body having a first surface, a second surface, and an inclined grease guiding surface. The first surface is provided with a shaft hole penetrating through the body and connecting the first surface and the second surface. The inclined grease guiding surface is sloped on the first surface. Two end edges of the inclined grease guiding surface individually connect the first surface and the shaft hole.

To achieve the above objectives, the present invention provides a heat dissipating fan which comprises a fan bracket, a bearing structure, a stator assembly, and a rotor assembly.

The fan bracket vertically extends to form a shaft sleeve in which a receiving space is disposed.

The bearing structure is disposed in the receiving space. The bearing structure comprises a body having a first surface, a second surface, and an inclined grease guiding surface. The first surface is provided with a shaft hole penetrating through the body and connecting the first surface and the second surface. Two end edges of the inclined grease guiding surface individually connect the first surface and the shaft hole.

The stator assembly is sleeved around the shaft sleeve. The rotor assembly has a wheel hub and a shaft disposed vertically therein. A plurality of fan blades are disposed around the wheel hub. The shaft penetrates through the shaft hole and is pivoted on the body.

As for the bearing structure and the heat dissipating fan of the present invention, when the heat dissipating fan stops rotating, the lubricating grease thrown out of the bearing can flow back, along the inclined grease guiding surface of the bearing structure, to the bearing and be stored again, which further increases the lifetime of the whole fan.

DETAILED DESCRIPTION OF THE INVENTION

The above objectives, structural and functional characteristics of the present invention will be described according to the preferred embodiments in the accompanying drawings.

Figure 1:
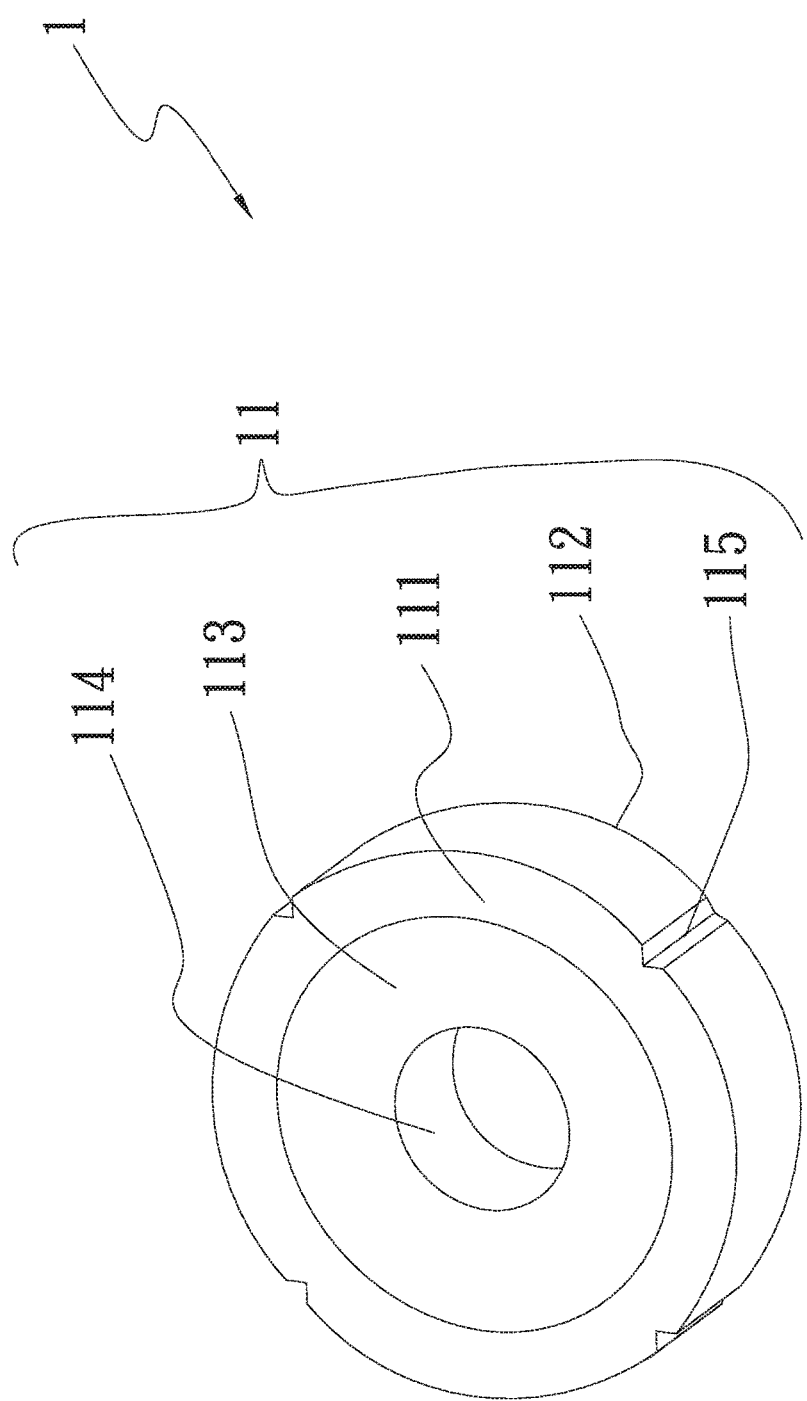
FIG. 1 is a perspective view of the bearing structure according to the first embodiment of the present invention.
Figure 2:
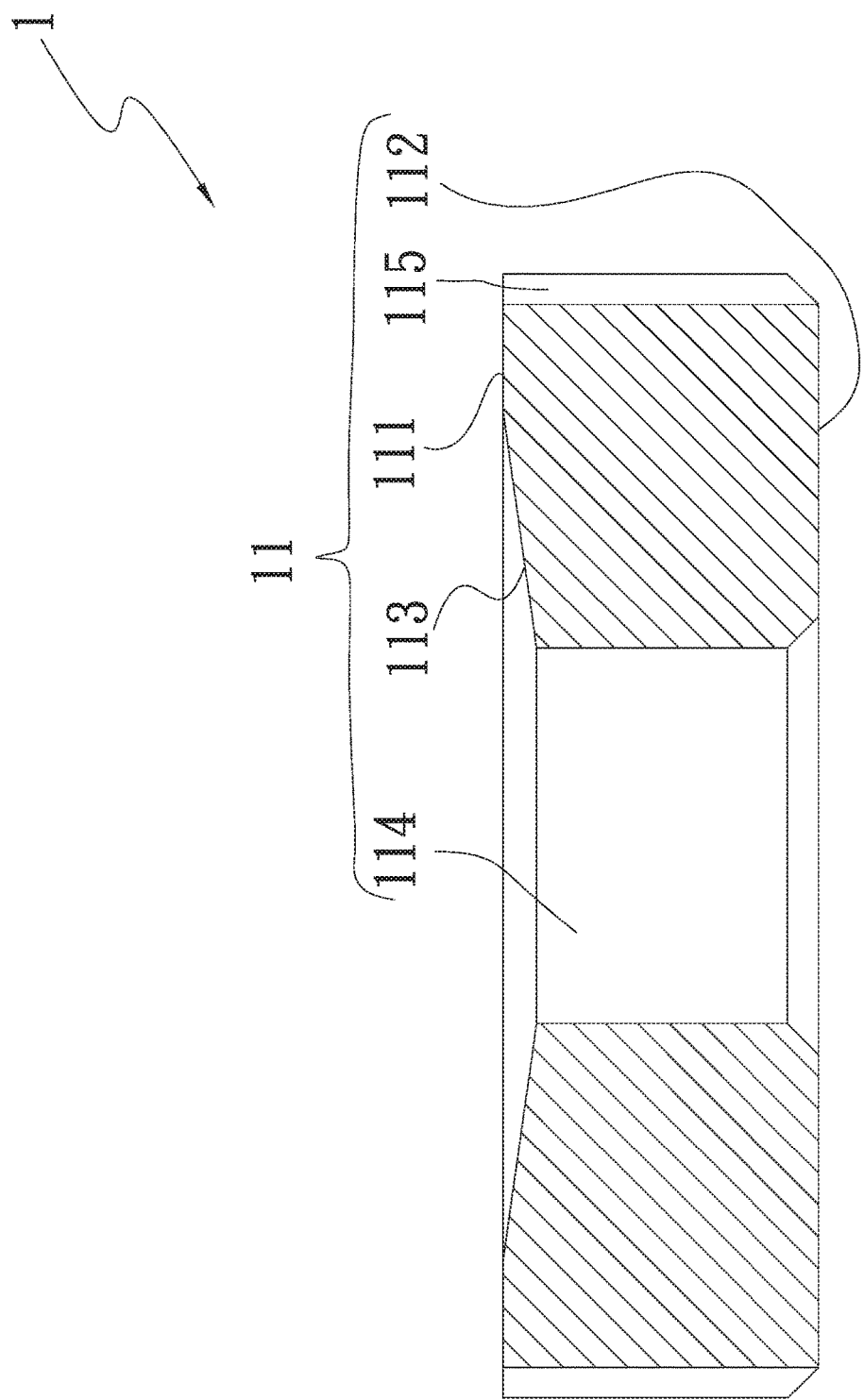
FIG. 2 is a cross-sectional view of the bearing structure according to the first embodiment of the present invention.

Please refer to FIGS. 1 and 2, which are the perspective view and the cross-sectional view of the bearing structure according to the first embodiment of the present invention, respectively. As shown in above figures, the bearing structure 1 of the present invention comprises a body 11. The body 11 has a first surface 111, a second surface 112, and an inclined grease guiding surface 113. The first surface 111 is provided with a shaft hole 114 penetrating through the body 11 and connecting the first surface 111 and the second surface 112. The inclined grease guiding surface 113 is sloped on the first surface 111. Two end edges of the inclined grease guiding surface 113 individually connect the first surface 111 and the shaft hole 114.

A plurality of axial grease guiding grooves 115 are disposed at an outer edge of the body 11 and extend along the body 11 axially.

Figure 3:
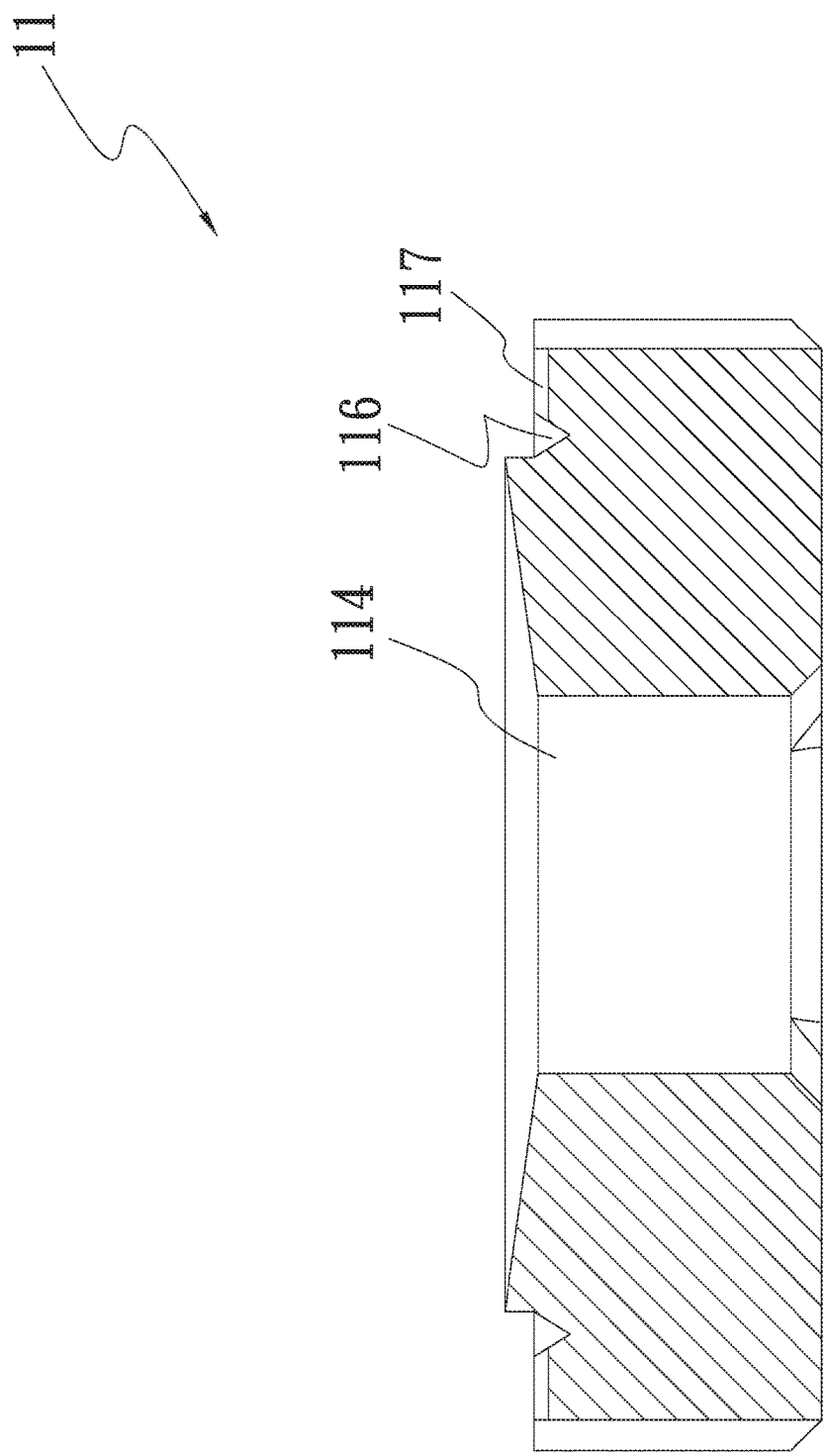
FIG. 3 is a cross-sectional view of the bearing structure according to the second embodiment of the present invention.

Please refer to FIG. 3, which is a cross-sectional view of the bearing structure according to the second embodiment of the present invention. As shown in FIG. 3, part of the structure in the current embodiment is the same as that in the first embodiment and will not be described here again. The difference between the current embodiment and the first embodiment is that, in the current embodiment, the body 11 further comprises a first groove 116 and a plurality of radial grease guiding grooves 117. The first groove 116 is disposed on the first surface 111 corresponding to the outer edge of the shaft hole 114. The radial grease guiding grooves 117 are disposed on the first surface 111 and the second surface 112. One end of each of the radial grease guiding grooves 117 disposed on the first surface 111 is connected to the first groove 116.

Figure 4:
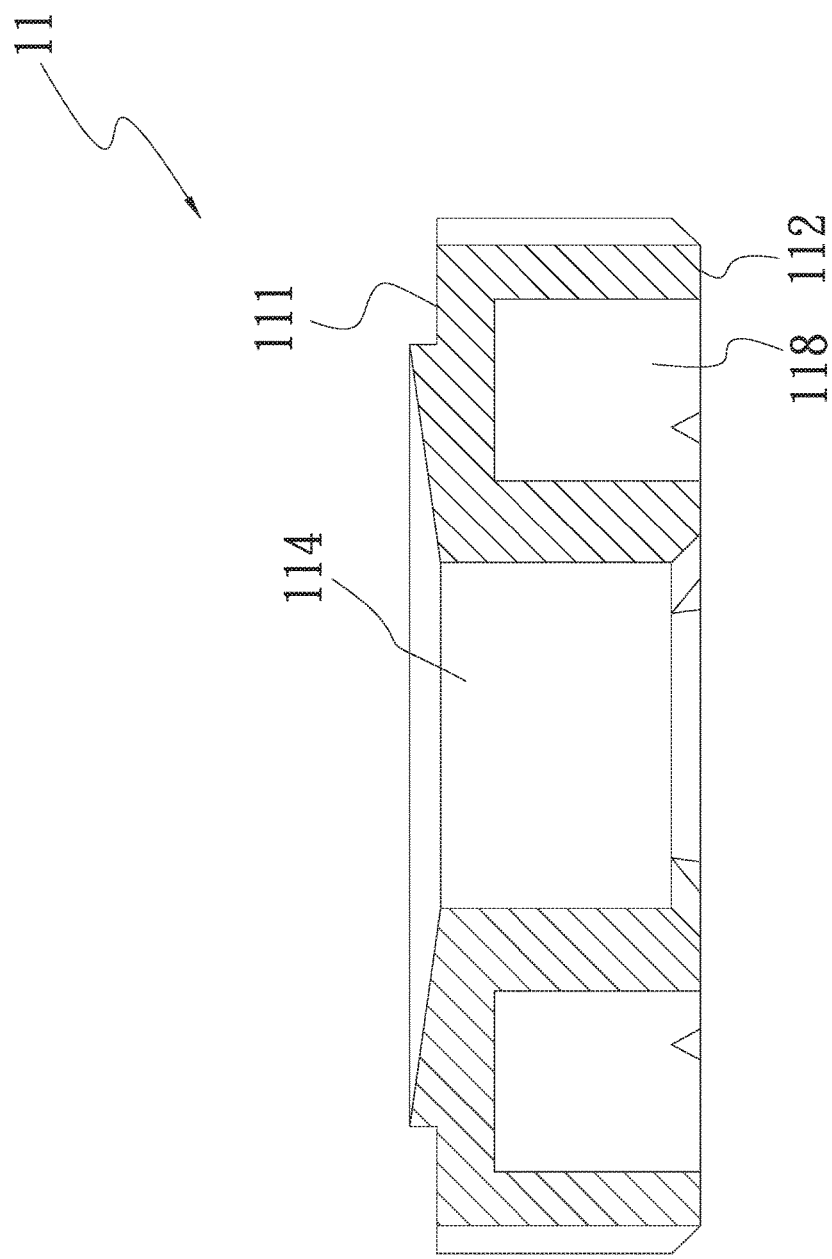
FIG. 4 is a cross-sectional view of the bearing structure according to the third embodiment of the present invention.

Please refer to FIG. 4, which is a cross-sectional view of the bearing structure according to the third embodiment of the present invention. As shown in FIG. 4, part of the structure in the current embodiment is the same as that in the first embodiment and will not be described here again. The difference between the current embodiment and the first embodiment is that, in the current embodiment, the body 11 further comprises a second groove 118 which is recessed on the second surface 112 in a direction from the second surface 112 to the first surface 111. The second groove 118 is disposed around the outside of the shaft hole 114 and in parallel with the shaft hole 114.

Figure 5:
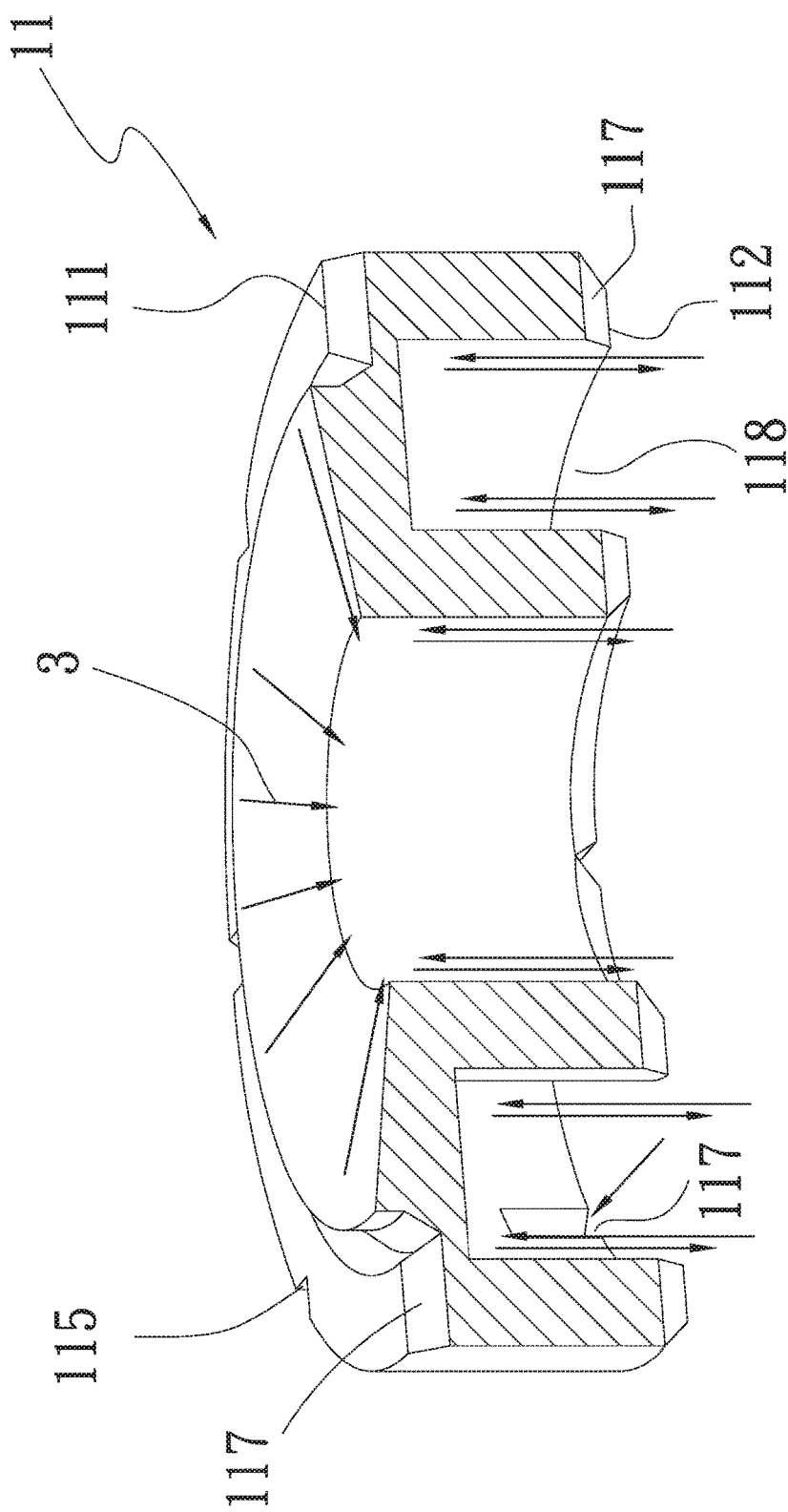
FIG. 5 is a perspective cross-sectional view of the bearing structure according to the fourth embodiment of the present invention.

Please refer to FIG. 5, which is a perspective cross-sectional view of the bearing structure according to the fourth embodiment of the present invention. As shown in FIG. 5, part of the structure in the current embodiment is the same as that in the third embodiment and will not be described here again. The difference between the current embodiment and the third embodiment is that, in the current embodiment, the body 11 further comprises a plurality of radial grease guiding grooves 117. The radial grease guiding grooves 117 are disposed on the first surface 111 and the second surface 112. The radial grease guiding grooves 117 disposed on the second surface 112 are individually connected to the shaft hole 114, the second groove 118, and the axial grease guiding grooves 115.

Figure 6:
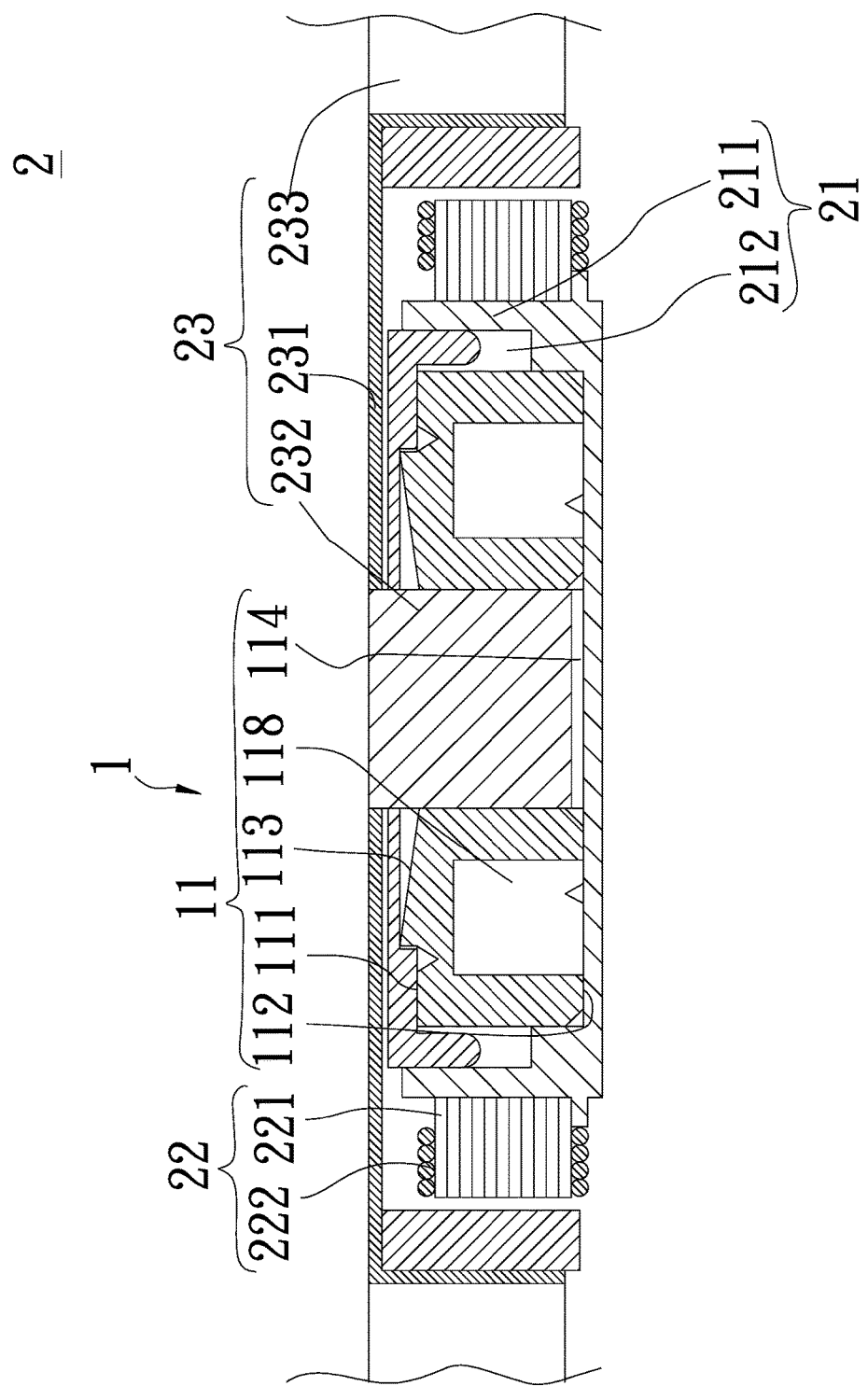
FIG. 6 is a cross-sectional view of the heat dissipating fan according to the first embodiment of the present invention.

Please refer to FIG. 6, which is a cross-sectional view of the heat dissipating fan according to the first embodiment of the present invention. As shown in FIG. 6, the bearing structure in the current embodiment can be that in any of the first, the second, the third, and the fourth embodiments. The bearing structure in the first embodiment is used as the bearing structure 1 in the current embodiment for explanation and is not limited to this. The heat dissipating fan 2 comprises a fan bracket 21, a bearing structure 1, a stator assembly 22, and a rotor assembly 23.

The fan bracket 21 vertically extends to form a shaft sleeve 211 in which a receiving space 212 is disposed. The bearing structure 1 is disposed in the receiving space 212 and comprises a body 11.

The body 11 has a first surface 111, a second surface 112, and an inclined grease guiding surface 113. The first surface 111 is provided with a shaft hole 114 penetrating through the body 11 and connecting the first surface 111 and the second surface 112. The inclined grease guiding surface 113 is sloped on the first surface 111. Two end edges of the inclined grease guiding surface 113 individually connect the first surface 111 and the shaft hole 114.

The stator assembly 22 is sleeved around the shaft sleeve 211 and comprises a plurality of silicon steel sheets 221. A plurality of coils 222 are wound around the outside of the silicon steel sheets 221. The rotor assembly 23 has a wheel hub 231 and a shaft 232 disposed vertically therein. A plurality of fan blades 233 are disposed around the wheel hub 231. The shaft 232 penetrates through the shaft hole 114 and is pivoted on the body 11.

Please also refer to FIGS. 1-5. Through the inclined grease guiding surface 113 disposed on the first surface 111 of the bearing structure 1, the bearing structure and the heat dissipating fan of the present invention can make the lubricating grease 3, which is thrown out during the operation of the heat dissipating fan 2, flow along the inclined grease guiding surface 113 back to the body 11 or the shaft hole 114 for reuse or storage.

The first groove 116 of the body 11 in the third embodiment is used as a mistake-proofing device to prevent the reverse installation of the bearing structure 1.

At least one of the radial grease guiding grooves 117 disposed on the second surface 112 of the body 11 is recessed toward the first surface 111, as shown in FIG. 5, such that the second groove 118 forms a storage groove having the ability of aerodynamic storage of grease. When the second groove 118 is disposed in the shaft sleeve 211, the grease can be stored at the intersection of the open end of the second groove 118 and the receiving space 212 in the shaft sleeve 211 of the fan bracket 21 and the air can be stored in the closed end of the second groove 118. When the temperature increases during the operation of the heat dissipating fan 2, the air in the closed end of the second groove 118 will expand to press the lubricating grease 3 out. When the heat dissipating fan 2 is not in operation, the temperature decreases and the air shrinks to absorb the lubricating grease 3 into the second groove 118.

What is claimed is:

1. A bearing structure, comprising:
a body having a first surface, a second surface, and an inclined grease guiding surface, wherein the first surface is provided with a shaft hole penetrating through the body and connecting the first surface and the second surface, wherein the inclined grease guiding surface is sloped on the first surface, wherein two end edges of the inclined grease guiding surface individually connect the first surface and the shaft hole;
wherein the body further comprises a second surface groove which is recessed on the second surface in a direction from the second surface to the first surface, wherein the second surface groove is disposed around the outside of the shaft hole and in parallel with the shaft hole.

2. A bearing structure, comprising:
a body having a first surface, a second surface, and an inclined grease guiding surface, wherein the first surface is provided with a shaft hole penetrating through the body and connecting the first surface and the second surface, wherein the inclined grease guiding surface is sloped on the first surface, wherein two end edges of the inclined grease guiding surface individually connect the first surface and the shaft hole;
a plurality of axial grease guiding grooves are disposed at an outer edge of the body;
wherein the body further comprises a first groove and a plurality of radial grease guiding grooves, wherein the first groove is recessed on the second surface in a direction from the second surface to the first surface, wherein the first groove surrounds the shaft hole and is disposed in parallel with the shaft hole, wherein the radial grease guiding grooves are disposed on the first surface and the second surface, wherein the radial grease guiding grooves disposed on the second surface are individually connected to the shaft hole, the second groove, and the axial grease guiding grooves.

3. The bearing structure according to claim 2, wherein the plurality of axial grease guiding grooves are extended along the body axially.

4. A heat dissipating fan, comprising:
a fan bracket vertically extending to form a shaft sleeve in which a receiving space is disposed;
a bearing structure disposed in the receiving space, wherein the bearing structure comprises a body having a first surface, a second surface, and an inclined grease guiding surface, wherein the first surface is provided with a shaft hole penetrating through the body and connecting the first surface and the second surface, wherein the inclined grease guiding surface is sloped on the first surface, wherein two end edges of the inclined grease guiding surface individually connect the first surface and the shaft hole;
a stator assembly sleeved around the shaft sleeve; and
a rotor assembly having a wheel hub and a shaft disposed vertically therein, wherein a plurality of fan blades are disposed around the wheel hub, wherein the shaft penetrates through the shaft hole and is pivoted on the body;
wherein the body further comprises a second surface groove which is recessed on the second surface in a direction from the second surface to the first surface, wherein the second surface groove surrounds the shaft hole and is disposed in parallel with the shaft hole.

5. A heat dissipating fan, comprising:
a fan bracket vertically extending to form a shaft sleeve in which a receiving space is disposed;
a bearing structure disposed in the receiving space, wherein the bearing structure comprises a body having a first surface, a second surface, and an inclined grease guiding surface, wherein the first surface is provided with a shaft hole penetrating through the body and connecting the first surface and the second surface, wherein the inclined grease guiding surface is sloped on the first surface, wherein two end edges of the inclined grease guiding surface individually connect the first surface and the shaft hole;
a stator assembly sleeved around the shaft sleeve; and
a rotor assembly having a wheel hub and a shaft disposed vertically therein, wherein a plurality of fan blades are disposed around the wheel hub, wherein the shaft penetrates through the shaft hole and is pivoted on the body;
a plurality of axial grease guiding grooves are disposed at an outer edge of the body;
wherein the body further comprises a second surface groove and a plurality of radial grease guiding grooves, wherein the second surface groove is recessed on the second surface in a direction from the second surface to the first surface, wherein the second surface groove surrounds the shaft hole and is disposed in parallel with the shaft hole, wherein the radial grease guiding grooves are disposed on the first surface and the second surface, wherein the radial grease guiding grooves disposed on the second surface are individually connected to the shaft hole, the second surface groove, and the axial grease guiding grooves.

6. The heat dissipating fan according to claim 5, wherein the plurality of axial grease guiding grooves are extended along the body axially.

* * * * *